United States Patent
Morita (10) Patent No.: US 9,218,351 B2
(45) Date of Patent: Dec. 22, 2015

(54) INFORMATION PROCESSING APPARATUS, STORAGE MEDIUM, AND CONTROL METHOD

(71) Applicant: CANON KABUSHIKI KAISHA, Tokyo (JP)

(72) Inventor: Keisuke Morita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 177 days.

(21) Appl. No.: 14/019,189

(22) Filed: Sep. 5, 2013

(65) Prior Publication Data

US 2014/0074897 A1   Mar. 13, 2014

(30) Foreign Application Priority Data

Sep. 7, 2012   (JP) .................. 2012-197269

(51) Int. Cl.
*G06F 17/30* (2006.01)

(52) U.S. Cl.
CPC ................. *G06F 17/30117* (2013.01)

(58) Field of Classification Search
CPC .................. G06F 17/30; G06F 17/00
USPC .................................................. 707/600–899
See application file for complete search history.

(56) References Cited

U.S. PATENT DOCUMENTS

2011/0295798 A1*  12/2011  Shain ........................... 707/617

FOREIGN PATENT DOCUMENTS

JP        2008-529127 A      7/2008

* cited by examiner

*Primary Examiner* — Isaac M Woo
(74) *Attorney, Agent, or Firm* — Canon USA, Inc., IP Division (57) ABSTRACT

An information processing apparatus includes a first saving unit configured to save a file received by a first receiving method for receiving one file via one request, a first deletion unit configured to, if it is determined that a file has been newly received, delete the file which the first saving unit has saved, a second saving unit configured to save a file received by a second receiving method which is capable of receiving a plurality of files via one request, and a second deletion unit configured to, if it is determined that a file has been newly received, delete the file which the second saving unit has saved with higher priority than deletion of the file, which the first saving unit has saved, by the first deletion unit.

14 Claims, 11 Drawing Sheets

| | URL | EXPIRATION DATE INFORMATION | ETAG | PUSH FLAG | PRIORITY | STREAM ID | ASSOCIATED STREAM ID |
|---|---|---|---|---|---|---|---|
| 807 | www.abc.com/index.html | 5 May 2012 12:34:56 GMT | "10c24bc-4ab-457e1c1f" | 0 | 0 | 2dc942a5 | 0 |
| 808 | www.abc.com/main.html | 4 Jun 2012 12:34:57 GMT | "50d11af-fa1-864e1c2f" | 1 | 3 | 4afd0b40 | 2dc942a5 |
| 809 | www.abc.com/profile.html | 7 Aug 2012 12:34:58 GMT | "850c545a-6ac-4a7d1c3f" | 1 | 6 | 0f2d3c80 | 2dc942a5 |
| 810 | www.abc.com/photo.jpg | 7 Aug 2012 12:34:58 GMT | "61a21af-fff-4a2b2c8f" | 0 | 0 | b9b7facc | 0 |
| 811 | www.zzz.co.jp/3e6577b1 | 1 Jan 2011 12:34:59 GMT | "1513a23a-ff3-43cd1c3f" | 0 | 0 | 03f90f43 | 0 |
| | www.zzz.co.jp/778ceeac | 9 Sep 2012 12:34:59 GMT | "22a21cc-b36-822672c8" | 1 | 3 | 7de05215 | 03f90f43 |
| | ... | ... | ... | ... | ... | ... | ... |

INFORMATION PROCESSING APPARATUS, STORAGE MEDIUM, AND CONTROL METHOD

BACKGROUND OF THE INVENTION

1. Field of the Invention

The present invention relates to a technique for deleting received and saved files.

2. Description of the Related Art

A technique exists for caching and storing a once-acquired file to be ready for using it again. Japanese Unexamined Patent Application Publication No. 2008-529127 discusses the technique that enables a client to store objects which a server side dynamically generates, and to handle them by differentiating the dynamic object from a static object.

It is assumed that an environment exists where files can be received by a Get receiving method for receiving one file via one request, and a Push receiving method for receiving a plurality of files via one request.

On the other hand, in Japanese Unexamined Patent Application Publication No. 2008-529127, there are no discussions about the Push receiving method. Therefore, if the above-described environment is assumed, the files received and saved by the Push receiving method are likely to exceed the files received and saved by the Get receiving method.

SUMMARY OF THE INVENTION

Therefore, the present invention aims to provide a technique for effectively managing a cache, by deleting the files received and saved by the Push receiving method in accordance with a condition, with higher priority than the files received and saved by the Get receiving method.

According to an aspect of the present invention, an information processing apparatus includes a first saving unit configured to save a file received by a first receiving method for receiving one file via one request, a first deletion unit configured to, if it is determined that a file has been newly received, delete the file which the first saving unit has saved, a second saving unit configured to save a file received by a second receiving method which is capable of receiving a plurality of files via one request, and a second deletion unit configured to, if it is determined that a file has been newly received, delete the file which the second saving unit has saved with higher priority than deletion of the file, which the first saving unit has saved, by the first deletion unit.

Further features of the present invention will become apparent from the following description of exemplary embodiments with reference to the attached drawings.

DESCRIPTION OF THE EMBODIMENTS

Before describing exemplary embodiments, terminologies to be used in the descriptions and communication protocols to be covered by the present specification will be defined.

A socket is a notation for identifying and classifying communications in a transmission control protocol (TCP) layer. In many cases, an Internet protocol (IP) is generally used as a low-level layer, and, in this case, the socket is a pair of an IP address and a port number.

A TCP connection means a communication path in the TCP layer. Specifically, the TCP connection is a pair of reception-side socket and transmission-side socket.

A reception window size is capacity of a free buffer on the reception side. The TCP protocol also performs processing using a window size, but, hereinafter, when written as a window size, it means the window size used in a targeted upper communication protocol.

Stream is a logic channel in the targeted upper communication protocol.

A Frame 301 is a block in a minimum unit of data that is finely segmented when the data is actually transmitted. However, the frame 301 has no relationship with a frame of a data link layer used in the 7 layers of open systems interconnection (OSI) model advocated by the International Organization for Standardization (ISO), and refers to a minimum data unit in the targeted upper communication protocol.

Figure 3:
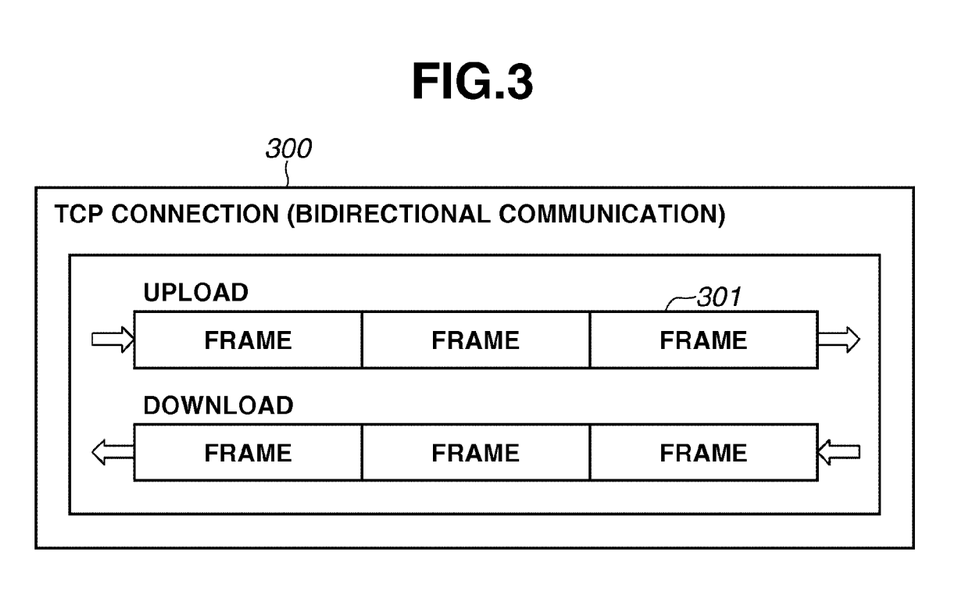
FIG. 3 is a configuration diagram of a target protocol.

The communication protocol covered by the present Specification will be described. Hereinafter, it is described as a target protocol. The target protocol uses the TCP protocol. However, an intermediate protocol (e.g., Transport Layer Security (TLS) protocol, Secure Sockets Layer (SSL) protocol) that maintains permeability with the TCP protocol may exist. The target protocol performs communication by transmitting and receiving data of a frame 301 on a TCP connection 300 (FIG. 3). The frame 301 has a frame size in a header.

Figure 4:
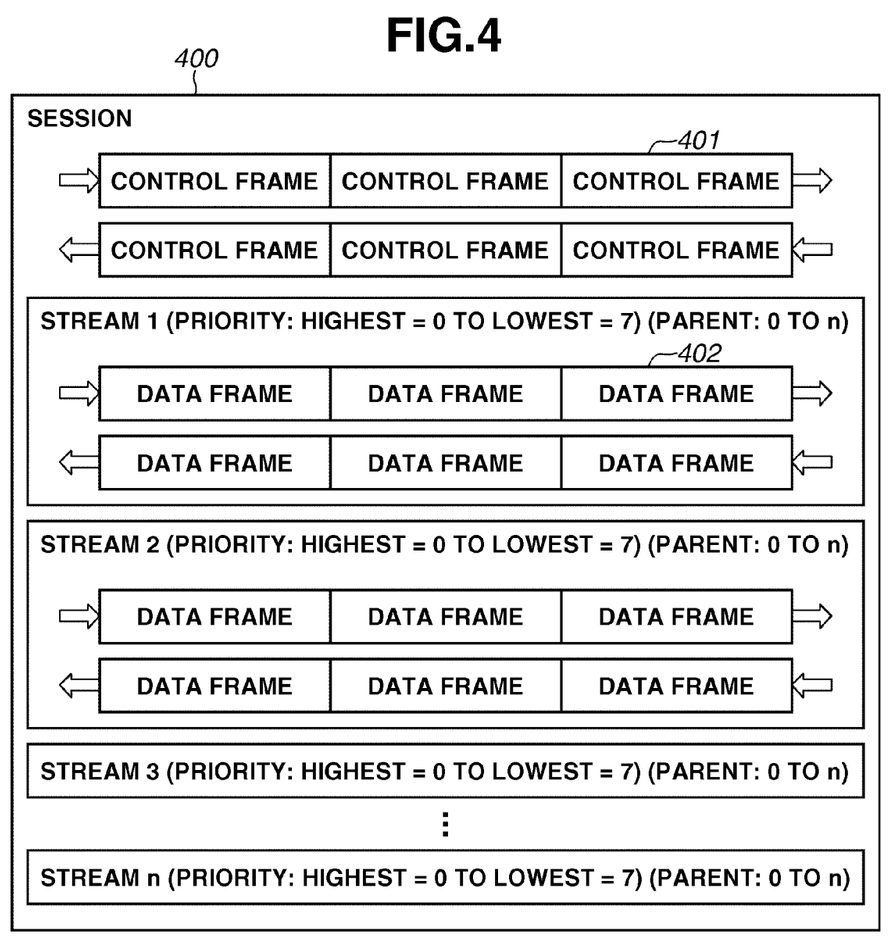
FIG. 4 is a data structure diagram of a target protocol.

FIG. 4 illustrates a data structure diagram of the target protocol. The target protocol is managed as a session 400 on the appropriate TCP connection 300. Further, a control frame 401 resides on a session 400, and communication relating to the session 400 is performed using the control frame 401. The target protocol may retain an arbitrary number of data streams 402 other than the control frame 401.

In the present Specification, a data stream is synonymous with a stream.

Actual data communications of upper applications and upper protocols are performed using the data streams 402. A priority can be set for each of the data streams 402. The number of priorities, for ease of description, is set to 8 ranks from the highest 0 to the lowest 7, but in actual operations, an arbitrary number of priorities instead of the 8 ranks may be also used.

Furthermore, a data stream has a stream ID by which each of the data streams can be identified.

Further, the data streams 402 can be given dependency relationship therebetween. If there is a parent in the data streams 402, dependency relationship can be expressed by assigning a parent stream ID to the parent stream. At that time, if there is no dependency relationship and there is no parent stream, that can be expressed by the data streams 402 having data indicating a blank, such as 0 or null, or by the data streams 402 not having a storage area itself of the stream ID.

The target protocol has no master-slave relationship between a server and a client, and performs communication as equals. At that time, in the present specification, issuing a file acquisition request using a Get command of hypertext transfer protocol (HTTP) by a client is referred to as a Get request, or simply as a Get, and a file obtained by the Get request is referred to as a Get file or Get data. In the Get, the client receives one file via one request (a Get receiving method). Further, issuing a transfer request for a file to the client by the server side is referred to as a Push request, or simply as a Push, and the file obtained by the Push request is referred to as a Push file or Push data. In the Push, the client receives one or more files via one request (a Push receiving method). In this manner the receiving methods are different between the Get and the Push.

With that, description of the target protocol data structure ends.

Next, a simple communication procedure for the target protocol will be described. A procedure for performing a certain data communication from the start of the communication, to the end of the communication will be described.

First, assuming that a TCP connection has been established. At this point of time, the server and the client retain a bidirectional communication channel. Next, the data stream 402 is created using the control frame 401. From either the server side or the client side, the data stream 402 can be created. In this case, web-based content acquisition is taken as an example.

In order to acquire a web-based content, the client needs to perform a Get request to the server. To this end, the client performs a creation request of the data stream 402 using a content stream. At that time, the client sets priority and dependency relationship of the data stream which the client wants to create. If the server accepts the creation request, the server sends a reply to permit the acceptance via the control frame 401. At that time, the server side may reject creation of the data stream 402. After the creation of the data stream 402, the server and the client can perform a Get request, or reply thereto using the created data stream 402. In this case, all pieces of data is transmitted and received via the data stream 402. When the client has finished reception of necessary data from the server, the stream needs to be closed. A termination request of the stream may be performed from either of the client side and the server side. As soon as there is no more data to be transmitted, the side which has received the termination request of the stream issues a termination request of the stream, and then terminates the stream. At that time, one-way communication may be performed by the one side not issuing intentionally the termination request.

As an example of creating the data stream 402 from the server side, a new data stream 402 may be created to dynamically Push a content to the client in response to a Get request from the client side. In this case, in the communication of the target protocol, the number of streams dynamically vary depending on time.

Figure 2:
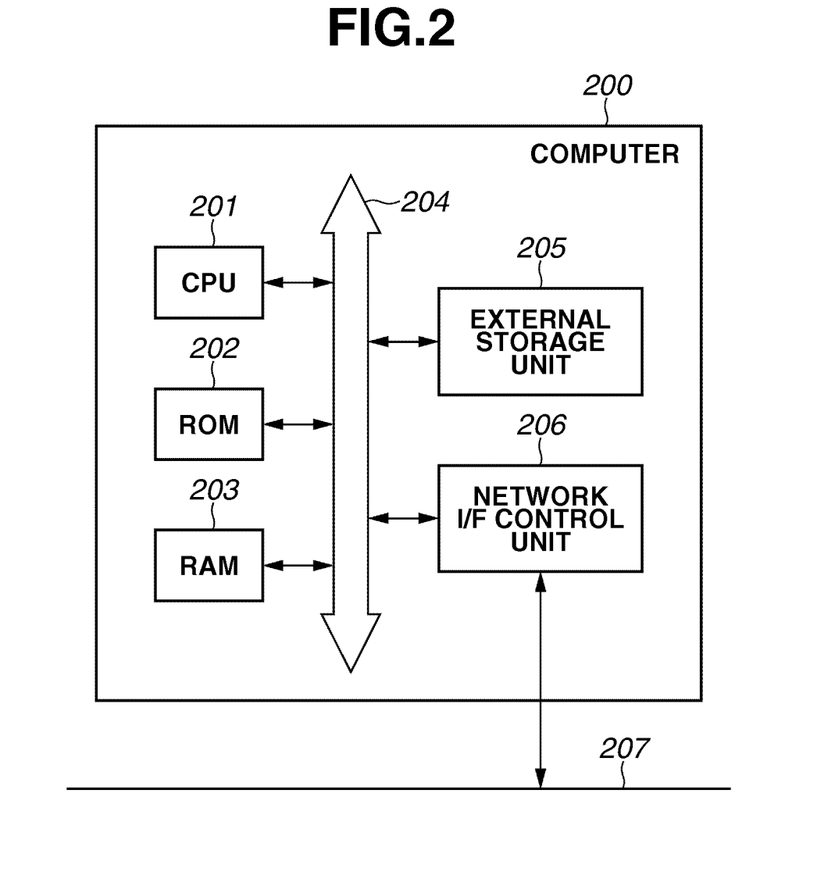
FIG. 2 is a configuration diagram of a system including a computer.

Hereinbelow, a first exemplary embodiment will be described. A computer as an example of an information processing apparatus of the present specification will be described. FIG. 2 is a block diagram illustrating a configuration of the computer according to the present exemplary embodiment. Unless otherwise specified, if the functions described in the present specification are executed, it is needless to say that even a single device, or a system composed of a plurality of devices can use the technique of the present specification. Further, unless otherwise specified, if the functions described in the present specification are executed, it is needless to say that even a system in which connections are established and processes are performed via a network such as a local area network (LAN), a wide area network (WAN) or an Internet can apply the technique described in the present Specification.

FIG. 2 illustrates a configuration of a computer 200, and a configuration of a client computer 103 and a configuration of a server computer 102 are the same as the configuration of the computer 200. The computer 200 includes a central processing unit (CPU) 201 that executes processing in which graphics, image characters, tables (including spreadsheets, etc.) are mixed, based on a document processing program stored in a program read only memory (ROM) of a ROM 202 or an external storage unit 205. Furthermore, the CPU 201 comprehensively controls respective devices connected to a system bus 204. Other than these, the computer 200 may include an input/output unit.

The program ROM of the ROM 202 or the external storage unit 205 stores an operation system which is a control program of the CPU 201. Various types of data are stored in a data ROM of the ROM 202 or the external storage unit 205.

A random access memory (RAM) 203 acts as a main memory and a work area of the CPU 201, and a network interface (I/F) control unit 206 controls transmission and reception of data to and from a LAN 207.

Figure 1:
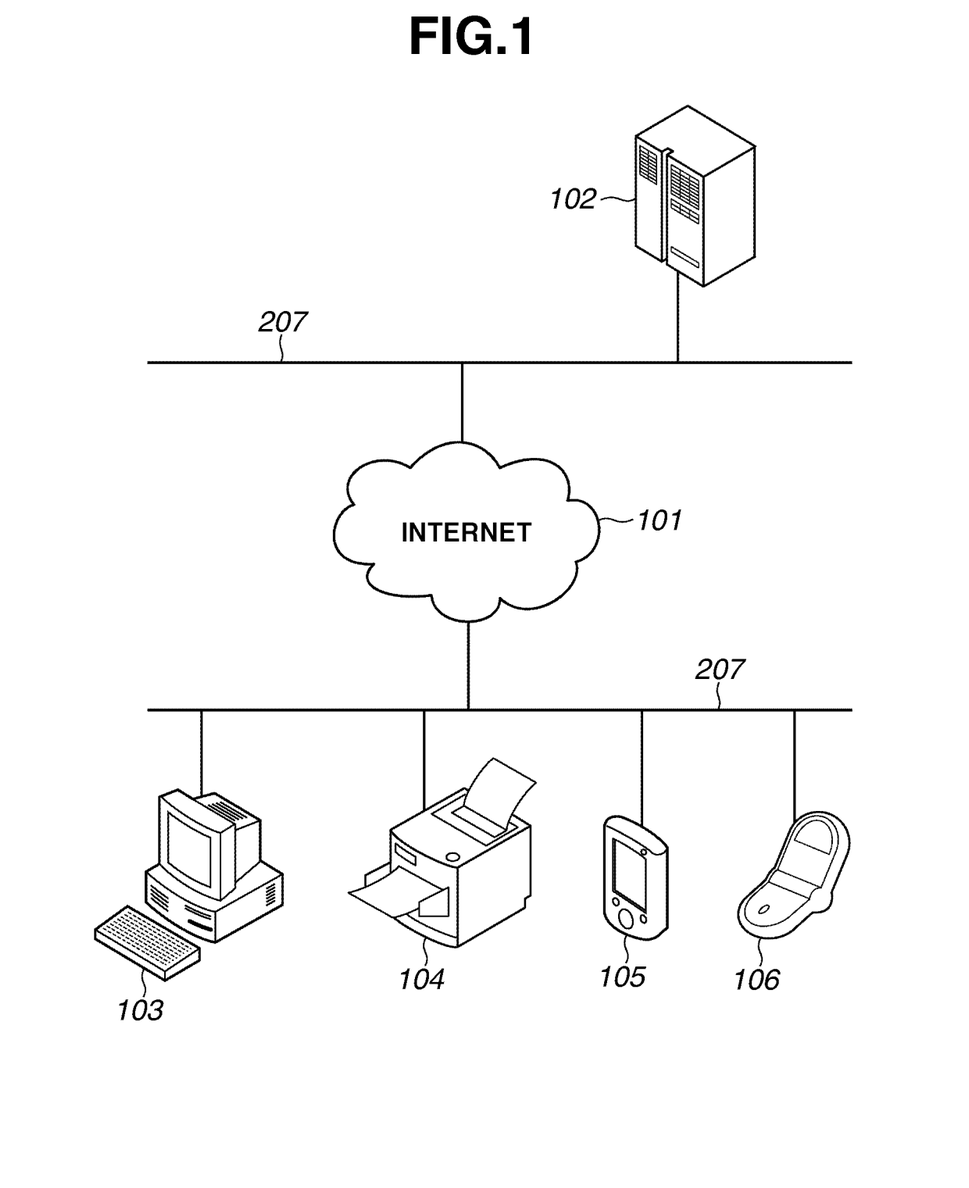
FIG. 1 is a network configuration diagram including a computer.

In FIG. 1, the LAN 207 is a communication line for exchanging information among the above respective apparatuses. An Internet 101 is a communication line for exchanging information among the above respective apparatuses across a firewall. Via the Internet 101, the server computer 102 and the LAN 207, to which the client computer 103 belongs, can communicate with each other across the firewall. The LAN 207 and the Internet 101 is a communication line network that supports, for example, TCP/IP protocols, and is indifferent to wired or wireless. In FIG. 1, the server computer 102 is indicated as a server, but it may be configured by a plurality of server computers. Alternatively, it may be configured as a virtual personal computer (PC).

In addition, the CPU 201 executes processing based on a program stored in the external storage unit 205, and thereby the processes at respective steps of the flowcharts described below are executed.

In the following descriptions, the computer 200 is described taking the client computer 103 as an example, but basically anything may be used as long as it is a terminal which exchanges data with a communication function, as well as a device 104 having a printing function, a mobile terminal 105, or a mobile phone 106. Further, it is assumed that the same is true even if it is configured as a virtual PC. In the present specification, the side which performs an acquisition request of data is referred to as a client by its role, and the side which provides data is referred to as a server. For this reason, it is assumed that a computer for use in the server may perform an acquisition request of data as a client, and a client computer may provide data as a server.

Figure 5:
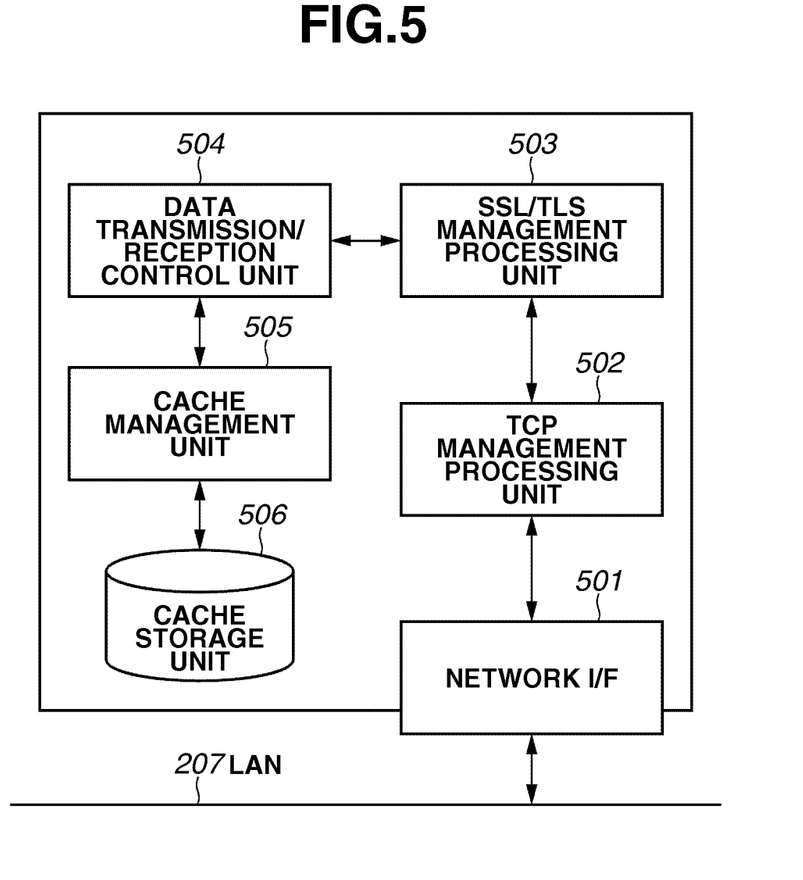
FIG. 5 is a software configuration diagram.

At that time, a software configuration in the computer 200 includes components in FIG. 5. First, a network I/F 501 is a portion which directly performs communication with an external network via the LAN 207 and indicates a software processing unit of the network I/F control unit 206. Transmission and reception queues of data at the time of performing communication are managed by the TCP layer, and a TCP management processing unit 502 performs communication, where necessary, at a stage where a data packet is accumulated in a transmission and reception queue of data. An SSL/TLS management processing unit 503 is a processing unit that manages an SSL or TLS layer. In the present target protocol, use of SSL or TLS is not essential, but the reality is that SSL or TLS is used in most cases from the viewpoint of problems with security and a firewall, and, therefore, SSL or TLS has been described.

The SSL/TLS management processing unit 503 may employ any implementation method as long as the implementation method complies with Standards (Request For Comments (RFC) 2246, RFC4346). Further, the processing unit may be an intermediate protocol other than SSL, TLS. A data transmission/reception control unit 504 performs waiting and synchronization, and start and termination processing of communication stream, at the time of data transmission/reception. A cache management unit 505 performs registration, update, deletion, query processes to a cache table of received data. The data to be handled here may be data of a physical file, or may be data for temporary use such as the address, state, setting, and attribute of the device. A cache storage unit 506 is a region where the data handled by the cache management unit 505 is actually stored, and is not a processing unit of a program or the like. In the present exemplary embodiment, the external storage unit 205 is taken as an example, but a register within a processor of the CPU 201, and an address resolution protocol (ARP) cache to be used in the RAM 203 or in the network I/F control unit 206 are also included as a target.

Figure 6:
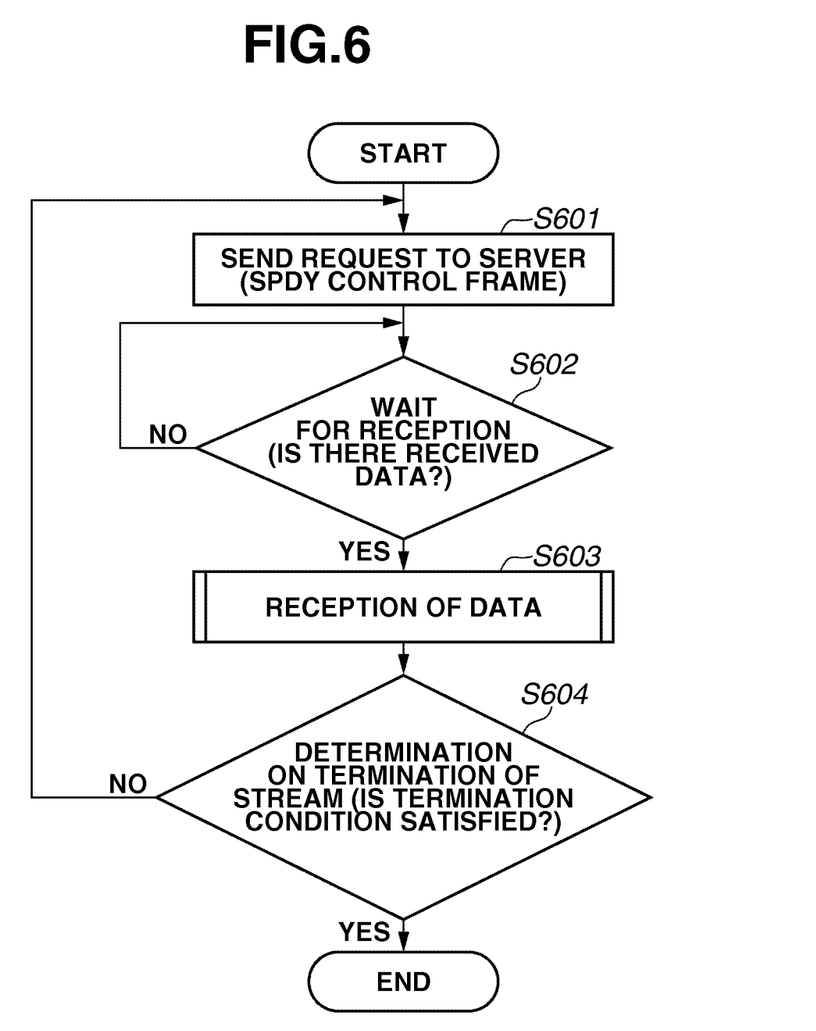
FIG. 6 is a flowchart illustrating processing for performing control of transmission and reception of data.

FIG. 6 is a flow of the processing on the client that performs control of the transmission and reception of data. In step S601, the CPU 201 issues a request for data, that is, a Get request to the server side. In this process, generation of stream is performed using the control frame 401. At that time, the control frame includes stream ID, associated stream ID, and priority information of the stream, besides data information necessary for communication including identification name and length of data. In step S602, the CPU 201 waits until it actually receives data after issuing the Get request. In step S603, which is processing of reception of the data, the CPU 201 performs reception of data, analysis of the received data (received file), and storage of the data in a cache region. In step S604, the CPU 201 determines whether the stream satisfies a termination condition. In the target protocol in the present specification, if both the server and the client perform termination request of the stream, the target stream is supposed to be terminated. However, in addition to this, even acceptance rejection of the stream and an error due to protocol violation terminate communication. Even in such cases, it is regarded that the stream has been terminated.

Figure 7:
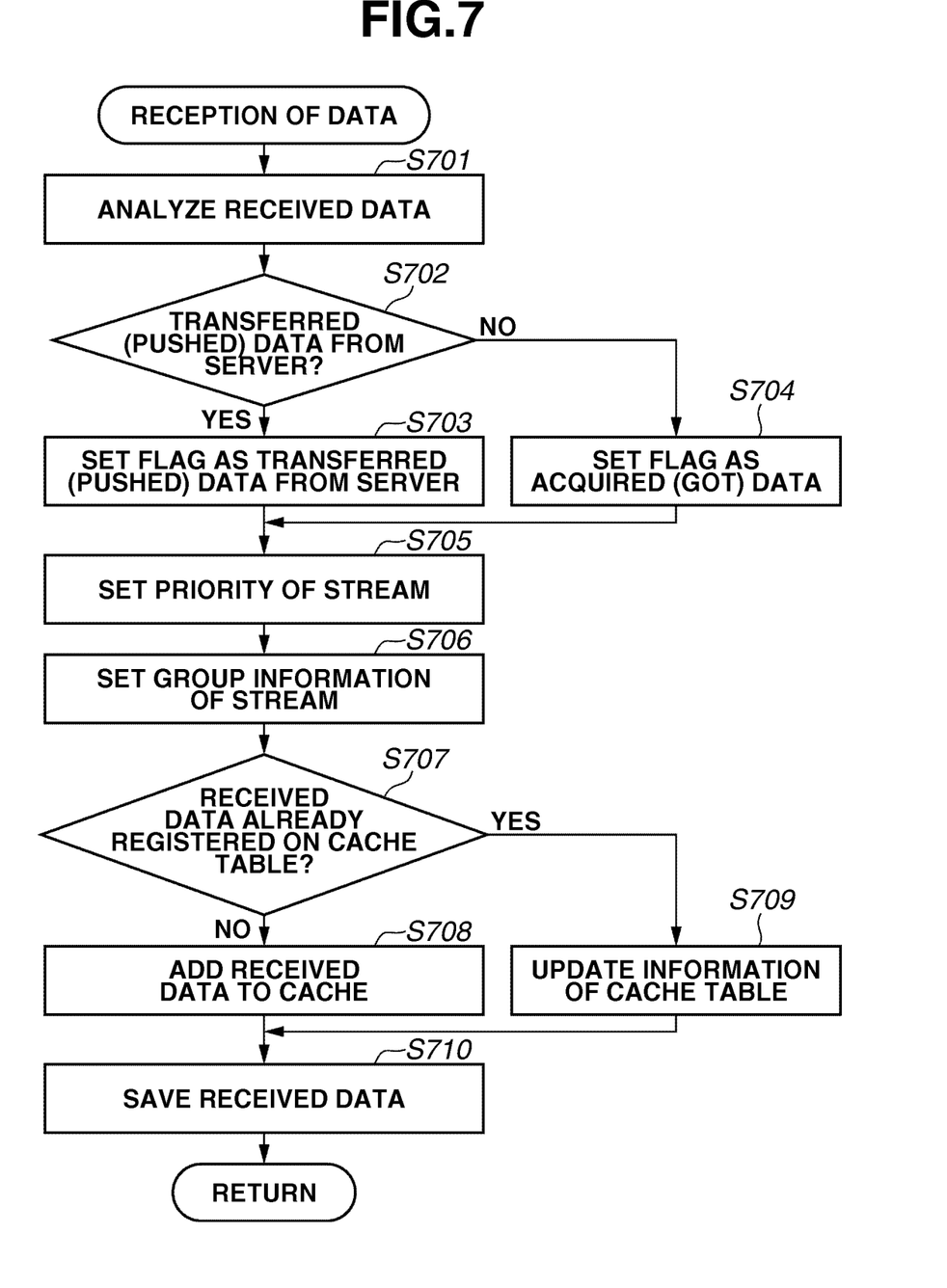
FIG. 7 is a flowchart illustrating reception of data.
Figure 8:
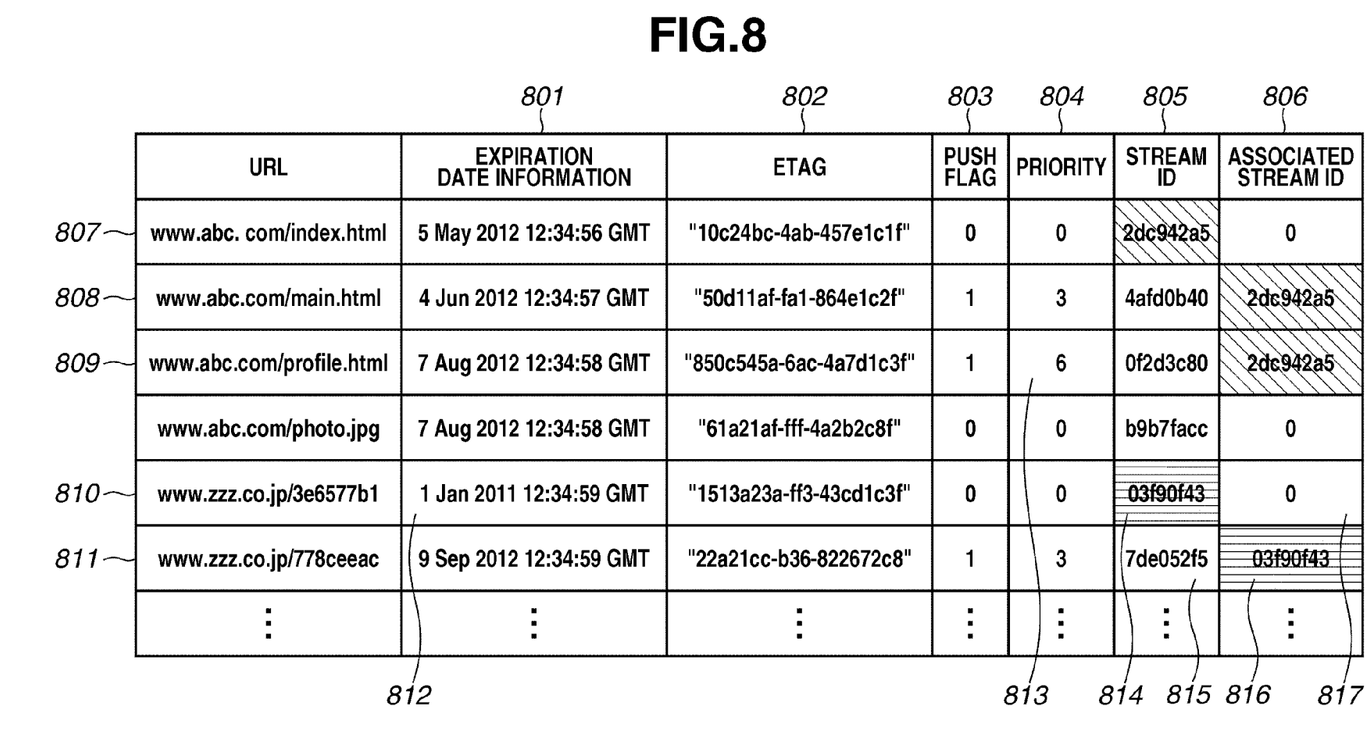
FIG. 8 illustrates a structure example of a cache table.

FIG. 7 is a flow illustrating the processing of reception of data performed by the client side. In this case, FIG. 8 is used as an example of the cache table in data storage. First, in step S701, the CPU 201 analyzes a header part of received data. In this case, this corresponds to extraction of stream ID for storing the received data in a cache region, associated stream ID, and priority information of stream, as well as information necessary for transmission and reception of the data. In step S702, the CPU 201 discriminates whether the received data corresponds to transferred data from the server. That is, the determination is made as to whether the received data has been Pushed. In the present specification, it is determined whether the received data is data which has not been Got until now. If the received data is data which has not yet been Got, it is determined as Pushed data. A determination as to whether the received data is data which has not been yet Got until now can be realized by storing a list of Got data. As a result of the determination, if it is regarded as the transferred data from the server (YES in step S702), in step S703, the CPU 201 sets a flag indicating Pushed data, and stores the Pushed data in the RAM 203. If it is regarded as acquired data when the user issues a request (NO in step S702), in step S704, the CPU 201 sets a flag indicating Got data, and stores the Got data in the RAM 203. The settings of such flags can be realized by registering the flags on the cache table as Push flag information 803 which indicates whether the received data is the Pushed data. In this case, the Got data is registered as 0, and the Pushed data as 1. In step S705, the CPU 201 registers priority information 804 of stream. The priority refers to a value being set for the stream in a time of communication, but, if ranks of priority are designated in advance on a client application side, for example, if 3 ranks of low/middle/high are designated, then registration may be integrally performed on the value. In step S706, the CPU 201 performs registration of group information of stream, that is, information of appropriate stream and stream associated with the appropriate stream. Information of associated stream ID 806 is information which the server transmits to the client. Therefore, the CPU 201 directly registers the acquired associated stream ID 806 on the cache table of FIG. 8. In step S707, the CPU 201 determines whether the received data has been already registered on the cache table. If the received data is new data and not yet registered (NO in step S707), the processing proceeds to step S708, and a row for the received data information is added to the cache table. If the received data is already registered (YES in step S707), the processing proceeds to step S709, and the CPU 201 updates differential data. At that time, even if there is no change as data, with regard to a case where Push flag information shifts from Pushed to Got, the CPU 201 performs update assuming that the Push flag information has been Got (0).

In step S710, the CPU 201 saves data which has been received via Push or Get (Push saving or Get saving). At that time, Push and Get may be saved in separate directories, or may be realized by providing each one of steps for saving Push and Get. When the processing in step S710 ends, then the processing in FIG. 7 ends.

Figure 9:
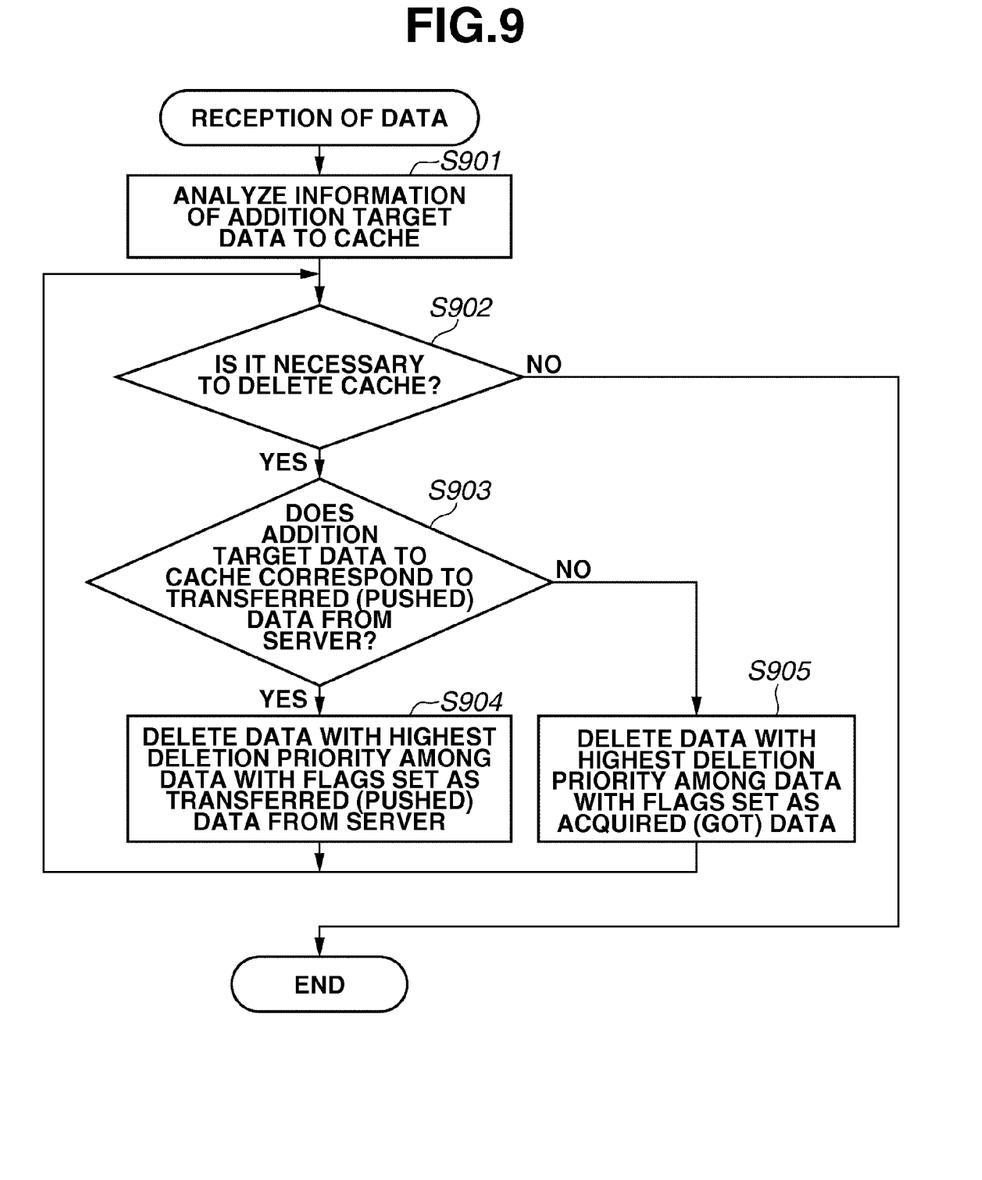
FIG. 9 is a flowchart illustrating processing for performing deletion of data registered on a cache table.

FIG. 9 is a flow of the processing for deleting data registered on the cache table. The processing is invoked when a cache capacity has exceeded a predetermined capacity set by a user or application. For example, immediately after having performed data analysis in step S701 at a time of reception of data, the processing is invoked. When deletion processing of the cache is invoked, first in step S901, the CPU 201 analyzes information of addition target data to the cache, that is, the received data. The processing to be performed in this case is the same as the discrimination as to Get data or Push data in step S702. If the determination has been already made, existing determination result may be used.

In step S902, it is determined whether it is necessary to delete the cache.

For example, if a free region of the cache is equal to or less than a file size, the file being received cannot be physically stored in the cache. Consequently, a determination as to whether it is necessary to delete the cache, leads to a determination that it is necessary to delete the cache. This is the same as the determination as to whether a total capacity of addition target data (newly received data) and cache exceeds a predetermined capacity. At this time, the total capacity may be a total of Get data and Push data.

Alternatively, the total capacity may be separately calculated between Get data and Push data. When it is configured in this manner, if the addition target data is Get, it may be determined whether a total capacity of Get exceeds a predetermined capacity, and, if the addition target data is Push, it may be determined whether a total capacity of Push exceeds a predetermined capacity. By separately calculating the total capacity between Get data and Push data, the Get data and the Push data can be deleted with balance.

Alternatively, a determination may be made to delete the cache until a free capacity which a user or a system has designated in advance is reached.

In step S903, it is determined whether the received data has been obtained by Get or Push, based on the result in step S901. If the received data has been Pushed (YES in step S903), the processing proceeds to step S904. In step S904, the CPU 201 deletes data with the highest deletion priority among data with valid (value is set to 1) Push flags in the cache table. Taking FIG. 8 as an example, first, typical cache deletion will be described. If a determination to delete data simply based on only expiration date information 801 is made, a typical deletion target is cache data 810 since the expiration date 812 is set to the oldest. In contrast, the deletion target in the processing in step S904 is cache data 808, of which expiration date 812 is set to the oldest among the cache data with valid (value is set to 1) Push flag information 803. If the received data has been obtained by Get (NO in step S903), the processing proceeds to step S905. In step S905, the CPU 201 deletes data with oldest deletion priority among data with invalid (value is set to 0) Push flag information 803. In the example in FIG. 8, the cache data 810 will be the deletion target.

It may be configured not to provide step S905. If configured in such manner, a method for deleting Get data and Push data under different conditions (for example, elapsed time after Get data was acquired) is considered. By not providing step S905, it becomes possible to employ configuration for deleting only Push data with higher priority.

Furthermore, it may be configured such that respective steps of S903, S904, and step S905 are replaced with step S904. If it is configured in such a manner, a determination whether addition target data is Get data or Push data is not especially made. Instead, if it is determined that it is necessary to delete cache in step S902, the cache of Push data is deleted in step S904. Accordingly, similarly to the above-described configuration, it becomes possible to provide a configuration for deleting only Push data with higher priority.

By performing the above processes, Get data and Push data in the cache region can be managed separately so that they do not interfere with each other. In the example in FIG. 8, descriptions have been given using the expiration date information 801 for determination of priority of deletion, but actually the priority of deletion may be determined based on parameters such as size of data, a number of times of references, elapsed period since the last reference, acquisition date/time of data. Further, the priority of deletion may be determined by assigning weights to these respective parameters and combining them.

Hereinbelow, a second exemplary embodiment will be described. In the cache management method in the first exemplary embodiment, data which is least likely to be used has been selected from among data within a cache region, and has been deleted. However, Push data in a communication method of the target protocol is not data for which the user has originally issued an acquisition request. Thus, there is a high possibility of the Push data becoming immediately unnecessary when there is no more exchange of associated data. In the present exemplary embodiment, for example, when the session 400 in FIG. 4 is terminated (for example, including cancellation of acquisition of Get data), a method for collectively deleting the data acquired in data frames from a stream 1 to a stream n within the terminated session will be described.

Figure 10:
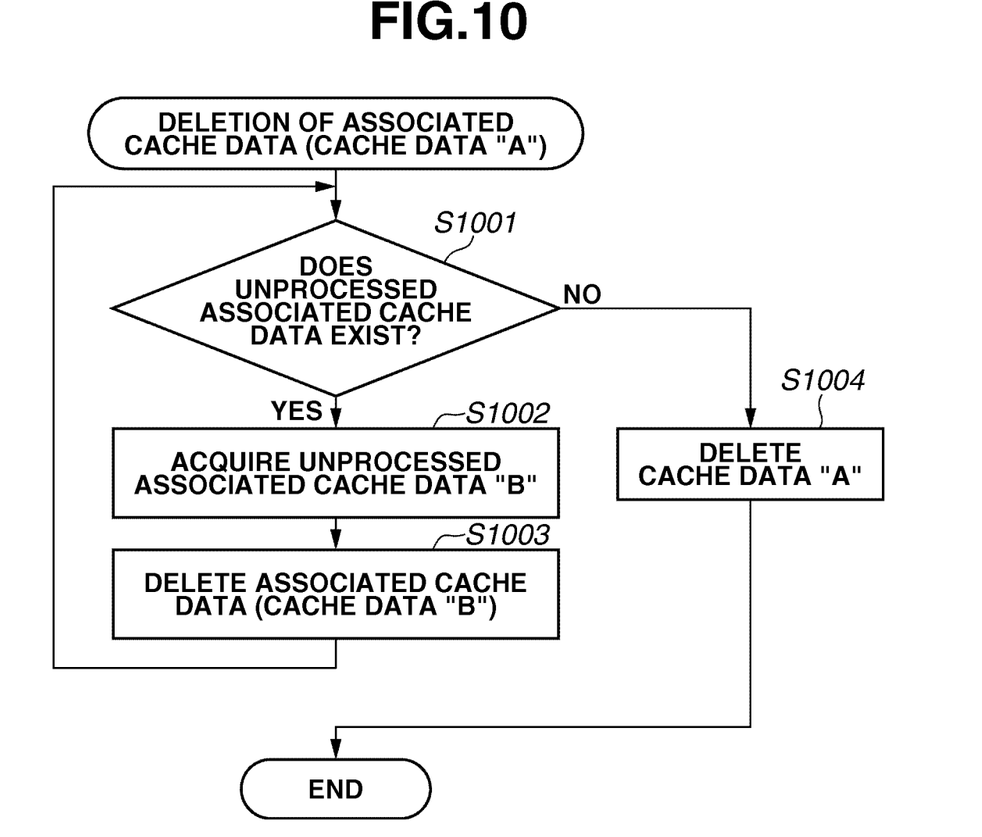
FIG. 10 is a flowchart illustrating processing for deleting cache data associated with other caches.

FIG. 10 is a flow illustrating the processing for deleting cache data associated with other caches. The association at that time refers to relationships assigned to the streams at a time of communication. Further, descriptions will be provided taking FIG. 8 as an example.

The processing illustrated in the flow is invoked when the communication session is terminated and data for which the user has issued an acquisition request becomes unnecessary. In a case where the data for which the user has issued the acquisition request was, for example the cache data 810, the flow in FIG. 10 is invoked using the cache data 810 as cache data "A".

In step S1001, it is determined whether cache data associated with the designated cache data "A" exists. In FIG. 8, for example, since there exists a cache data 811 registered as a stream ID 816, with which a stream ID 814 of the cache data 810 is associated, the processing proceeds to step S1002. In step S1002, unprocessed associated cache data is acquired. In the example in FIG. 8, the cache data 811 is acquired.

In step S1003, the flow in FIG. 10 is recursively invoked, and the processing is performed on the acquired cache data. By doing so, even if the cache data 811 has multi-hierarchical structure in which the cache data 811 has additional associated cache, it becomes possible to recursively invoke the processing to delete the cache. In the example in FIG. 8, the cache data 811, and cache data associated with the cache data 811 are deleted by the processing. The processing proceeds to step S1004 in FIG. 10 at a stage where unprocessed cache data is determined not to exist in step S1001. The cache data delivered to the flow in FIG. 10 is deleted. In the example in FIG. 8, the cache data 810 is deleted.

In step S1003, it may be configured to delete only Push data, delete only Get data, or delete both, whichever it may be.

When exchange of associated data ceases, by performing the above processing, cache data of associated stream can be deleted.

Figure 11:
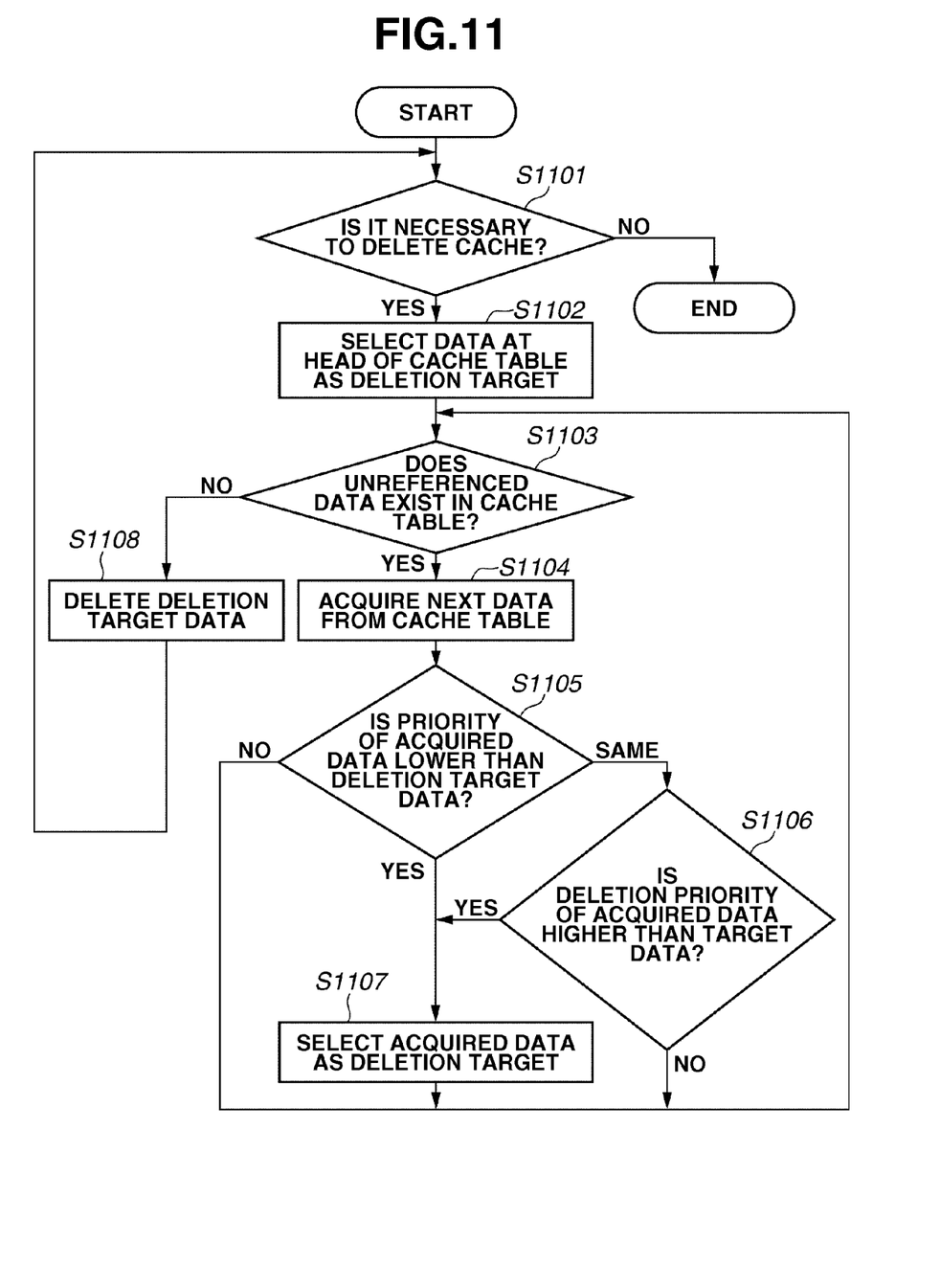
FIG. 11 is a flowchart illustrating processing in which priority information of a stream is used for determination of deletion priority.

A third exemplary embodiment will be described. In the target protocol, priority may be set for a stream at a time of communication. Therefore, in the present exemplary embodiment, an example of performing the processing will be described when priority of the stream is regarded as priority at which cache data is saved. FIG. 11 illustrates a flow of using priority information of the stream for calculation of deletion priority.

Without performing the processing based on the flow in FIG. 11, deletion priority in steps S904 and S905 in FIG. 9 may be determined using priorities of the streams.

In FIG. 8, it has been described that the cache data 810 having the expiration date 812 which is the oldest among the expiration date information 801 of the cache data is selected as a deletion target. In the present exemplary embodiment, a determination is further made using the priority information 804, and cache data 809 having the lowest priority 813 is selected as the deletion target.

In step S1101, it is determined whether it is necessary to delete cache. The determination is similar to the processing in step S902 in FIG. 9, and, therefore, the details will not be repeated. In step S1102, the CPU 201 selects head data in the cache table as the deletion target. In the example in FIG. 8, cache data 807 is first selected as the deletion target. In step S1103, it is determined whether unreferenced data exists in the cache table, and the processing from steps S1104 to S1107 are repeated until all pieces of data are referenced. The unreferenced data means data that has not been yet acquired in step S1104.

In step S1104, the CPU 201 acquires the next data of the data currently being referenced from the cache table. In the example in FIG. 8, since the cache data 807 is currently being referenced, the cache data 808 is acquired. In step S1105, the CPU 201 compares the priority information 804 of the acquired data and priority of current deletion target data. In the example in FIG. 8, priority 3 of the acquired cache data 808 is lower than priority 0 of the cache data 807 currently being selected as the deletion target. For this reason, in step S1107, the CPU 201 sets the selected cache data 808 as new deletion target data. Further, in a case where priority of the acquired data and priority of data selected as the deletion target data are the same (SAME in step S1105), furthermore, via determination in step S1106, the cache data with higher deletion priority is selected as the deletion target. Such processing is repeated, and, finally, data with the lowest priority and with high deletion priority is deleted via the processing in step S1108.

Accordingly, adequate processing can be performed when communication is performed using priority of stream as priority at which the cache data is saved.

Further, exemplary embodiments of the present invention may be also realized by executing the processing as below.

That is, this is the processing for supplying software (program) that realizes the functions of the above-described exemplary embodiments via a network or various types of storage media to a system or an apparatus, and causing a computer (such as a CPU, a micro processing unit (MPU), and the like) of the system or the apparatus to read and execute the program.

According to the exemplary embodiments of the present invention, caches can be effectively managed by deleting files received and saved by Push receiving method in accordance with the condition with higher priority than files received and saved by Get receiving method.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-197269 filed Sep. 7, 2012, which is hereby incorporated by reference herein in its entirety.

What is claimed is:

1. An information processing apparatus comprising:
a first saving unit configured to save a file received by a first receiving method for receiving one file via one request;
a first deletion unit configured to, in a case where a total of received files including the file which the first saving unit has saved exceeds a predetermined capacity and a file has been newly received, delete the file which the first saving unit has saved;
a second saving unit configured to save a file received by a second receiving method which is capable of receiving a plurality of files via one request; and
a second deletion unit configured to, in a case where a total of received files including the file which the second saving unit has saved exceeds a predetermined capacity and a file has been newly received, delete the file which the second saving unit has saved with higher priority than deletion of the file, which the first saving unit has saved, by the first deletion unit.

2. The information processing apparatus according to claim 1, wherein the second deletion unit and the first deletion unit delete files which the second saving unit and the first saving unit have saved, respectively, based on at least one of expiration date information, file size, the number of times of reference, an elapsed period since the last reference, acquisition date and time, and priority of a stream, of the received files.

3. The information processing apparatus according to claim 1, wherein a total of files to be deleted by the second deletion unit and the first deletion unit is a total of files received by the second receiving method and files received by the first receiving method.

4. The information processing apparatus according to claim 1, wherein the second deletion unit deletes, if an acquisition of a file by the first receiving method is canceled, a file received by the second receiving method within a session of the cancelled file.

5. The information processing apparatus according to claim 1, wherein the first receiving method is a method for enabling the information processing apparatus to receive a file by a Get from the information processing apparatus to a server, and the second receiving method is a method for enabling the information processing apparatus to receive a file by a Push from the server to the information processing apparatus.

6. A control method comprising:
a first saving for saving a file received by a first receiving method for receiving one file via one request;
a first deleting for deleting, in a case where a total of received files including the file which the first saving has saved exceeds a predetermined capacity and a file has been newly received, the file which the first saving has saved;
a second saving for saving a file received by a second receiving method which is capable of receiving a plurality of files via one request; and
a second deleting for deleting, in a case where a total of received files including the file which the second saving has saved exceeds a predetermined capacity and a file has been newly received, the file which the second saving has saved with higher priority than deletion of the file, which the first saving has saved, by the first deleting.

7. The control method according to claim 6, wherein the second deleting and the first deleting delete files which the second saving and the first saving have saved, respectively, based on at least one of expiration date information, file size, the number of times of reference, an elapsed period since the last reference, acquisition date and time, and priority of a stream, of the received files.

8. The control method according to claim 6, wherein a total of files to be deleted by the second deleting and the first deleting is a total of files received by the second receiving method and files received by the first receiving method.

9. The control method according to claim 6, wherein the second deleting deletes, if an acquisition of a file by the first receiving method is cancelled, a file received by the second receiving method within a session of the cancelled file.

10. The control method according to claim 6 wherein the first receiving method is a method for enabling the control method to receive a file by a Get to a server, and the second receiving method is a method for enabling the control method to receive a file by a Push from the server.

11. A non-transitory computer-readable storage medium storing a program that causes a computer to execute a method, the method comprising:

a first saving for saving a file received by a first receiving method for receiving one file via one request;

a first deleting for deleting, in a case where a total of received files including the file which the first saving has saved exceeds a predetermined capacity and a file has been newly received, the file which the first saving has saved;

a second saving for saving a file received by a second receiving method which is capable of receiving a plurality of files via one request; and a second deleting for deleting, in a case where a total of received files including the file which the second saving has saved exceeds a predetermined capacity and a file has been newly received, the file which the second saving has saved with higher priority than deletion of the file, which the first saving has saved, by the first deleting.

12. The non-transitory computer-readable storage medium according to claim 11, wherein the second deleting and the first deleting delete files which the second saving and the first saving have saved, respectively, based on at least one of expiration date information, file size, the number of times of reference, an elapsed period since the last reference, acquisition date and time, and priority of a stream, of the received files.

13. The non-transitory computer-readable storage medium according to claim 11, wherein a total of files to be deleted by the second deleting and the first deleting is a total of files received by the second receiving method and files received by the first receiving method.

14. The non-transitory computer-readable storage medium according to claim 11, wherein the second deleting deletes, if an acquisition of a file by the first receiving method is cancelled, a file received by the second receiving method within a session of the cancelled file.

* * * * *